US011346683B2

(12) United States Patent
Neubauer

(10) Patent No.: US 11,346,683 B2
(45) Date of Patent: May 31, 2022

(54) METHOD AND APPARATUS FOR PROVIDING ARGUMENTATIVE NAVIGATION ROUTING

(71) Applicant: HERE GLOBAL B.V., Eindhoven (NL)

(72) Inventor: Nicolas Neubauer, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 310 days.

(21) Appl. No.: 16/429,934

(22) Filed: Jun. 3, 2019

(65) Prior Publication Data
US 2020/0378783 A1    Dec. 3, 2020

(51) Int. Cl.
*G01C 21/00* (2006.01)
*G01C 21/36* (2006.01)
(Continued)

(52) U.S. Cl.
CPC ..... *G01C 21/3664* (2013.01); *G01C 21/3461* (2013.01); *G01C 21/3484* (2013.01);
(Continued)

(58) Field of Classification Search
CPC ............ G01C 21/3664; G01C 21/3461; G01C 21/3484; G01C 21/3691; G01C 21/3415; G01C 21/3608; G06N 5/04; G06N 20/00
See application file for complete search history.

(56) References Cited

U.S. PATENT DOCUMENTS

| 7,512,487 | B1 * | 3/2009 | Golding | G01C 21/3492 |
| | | | | 701/424 |
| 7,680,749 | B1 * | 3/2010 | Golding | G01C 21/3484 |
| | | | | 706/14 |

(Continued)

FOREIGN PATENT DOCUMENTS

EP    2672377 A2    12/2013

OTHER PUBLICATIONS

"Argument Maps as a Tool to Aid Critical Thinking", retrieved on Feb. 8, 2019 from https://www.truman.edu/wp-content/uploads/2018/04/argument-mapping-essay-Chad-Mohler.pdf?x81396, pp. 1-4.

*Primary Examiner* — Peter D Nolan
*Assistant Examiner* — Peter Y Ning
(74) *Attorney, Agent, or Firm* — Ditthavong, Steiner & Mlotkowski

(57) ABSTRACT

An approach is provided for argumentative navigation routing. The approach involves, for example, determining a recommended route and an alternative route. The approach also involves iteratively presenting one or more justification messages in support of the recommended route until a response is detected from a user that either rejects or accepts the one or more justification messages. The one or more justification messages are selected from among a plurality of argumentative reason classes. The approach further involves determining an accepted argumentative reason class from among the plurality of argumentative reason classes that corresponds to an accepted justification message of the one or more justification messages. The approach further involves prioritizing the accepted argumentative reason class to generate one or more subsequent justification messages in a subsequent argumentative routing interaction.

17 Claims, 10 Drawing Sheets

(51) Int. Cl.
*G01C 21/34* (2006.01)
*G06N 5/04* (2006.01)
*G06N 20/00* (2019.01)

(52) U.S. Cl.
CPC .......... *G01C 21/3691* (2013.01); *G06N 5/04* (2013.01); *G06N 20/00* (2019.01)

(56) References Cited

U.S. PATENT DOCUMENTS

| | | | | |
|---|---|---|---|---|
| 8,718,925 | B2* | 5/2014 | Letchner | G01C 21/3484 |
| | | | | 701/410 |
| 8,719,026 | B2* | 5/2014 | Kennewick | G10L 15/193 |
| | | | | 704/257 |
| 9,234,764 | B2 | 1/2016 | Yuan et al. | |
| 2001/0007968 | A1* | 7/2001 | Shimazu | G01C 21/3679 |
| | | | | 701/438 |
| 2002/0120396 | A1* | 8/2002 | Boies | G06Q 10/047 |
| | | | | 701/424 |
| 2002/0128773 | A1* | 9/2002 | Chowanic | G01C 21/3492 |
| | | | | 701/414 |
| 2005/0015197 | A1* | 1/2005 | Ohtsuji | G08G 1/0969 |
| | | | | 701/533 |
| 2006/0041378 | A1* | 2/2006 | Cheng | G08G 1/096838 |
| | | | | 701/431 |
| 2006/0041379 | A1* | 2/2006 | Brulle-Drews | G01C 21/3629 |
| | | | | 701/439 |
| 2011/0190008 | A1* | 8/2011 | Eronen | G01C 21/20 |
| | | | | 455/456.3 |
| 2013/0322634 | A1* | 12/2013 | Bennett | G01C 21/3629 |
| | | | | 381/17 |
| 2014/0100780 | A1* | 4/2014 | Caine | G01C 21/3453 |
| | | | | 701/533 |
| 2014/0309935 | A1* | 10/2014 | Ricci | G05D 1/0276 |
| | | | | 701/540 |
| 2015/0170512 | A1 | 6/2015 | Scofield | |
| 2015/0319093 | A1* | 11/2015 | Stolfus | G08G 1/0133 |
| | | | | 370/237 |
| 2016/0216130 | A1* | 7/2016 | Abramson | G01C 21/3423 |
| 2016/0320200 | A1* | 11/2016 | Delling | G01C 21/3605 |
| 2017/0069208 | A1* | 3/2017 | Nair | G01C 21/3492 |
| 2017/0167885 | A1 | 6/2017 | Adderly et al. | |
| 2017/0219368 | A1* | 8/2017 | Meredith | G01C 21/3484 |
| 2018/0094943 | A1* | 4/2018 | Grochocki, Jr | G01C 21/3415 |
| 2018/0348010 | A1* | 12/2018 | Coleman | G01C 21/3453 |
| 2019/0316919 | A1* | 10/2019 | Keshavamurthy | |
| | | | | G08G 1/096838 |
| 2020/0124435 | A1* | 4/2020 | Edwards | G08G 1/0969 |
| 2021/0356279 | A1* | 11/2021 | Szigeti | G01C 21/3453 |
| 2021/0381839 | A1* | 12/2021 | Verbeke | G01C 21/3407 |

\* cited by examiner

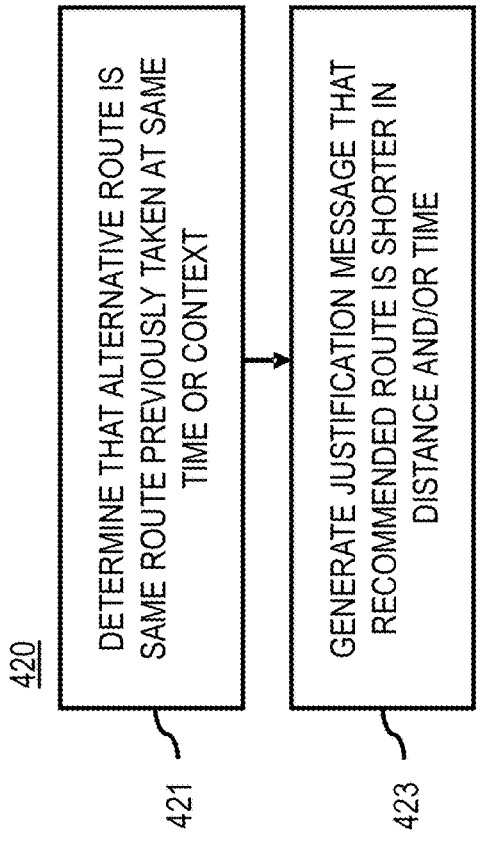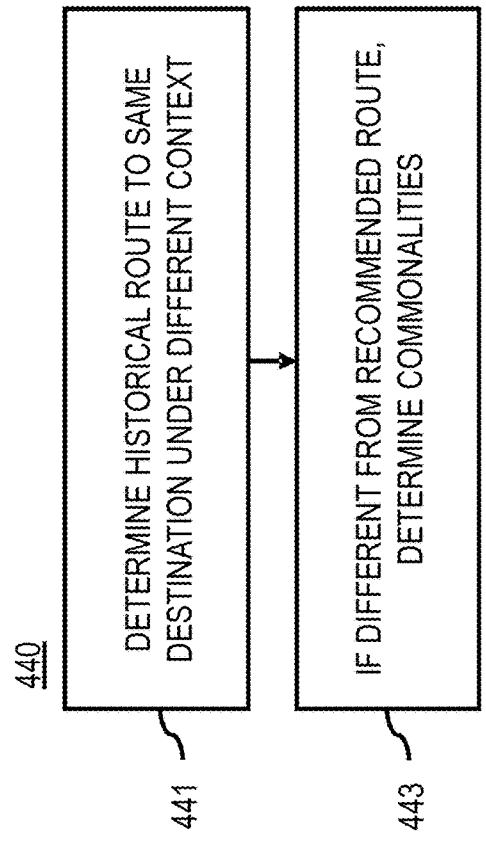
FIG. 4B
FIG. 4C

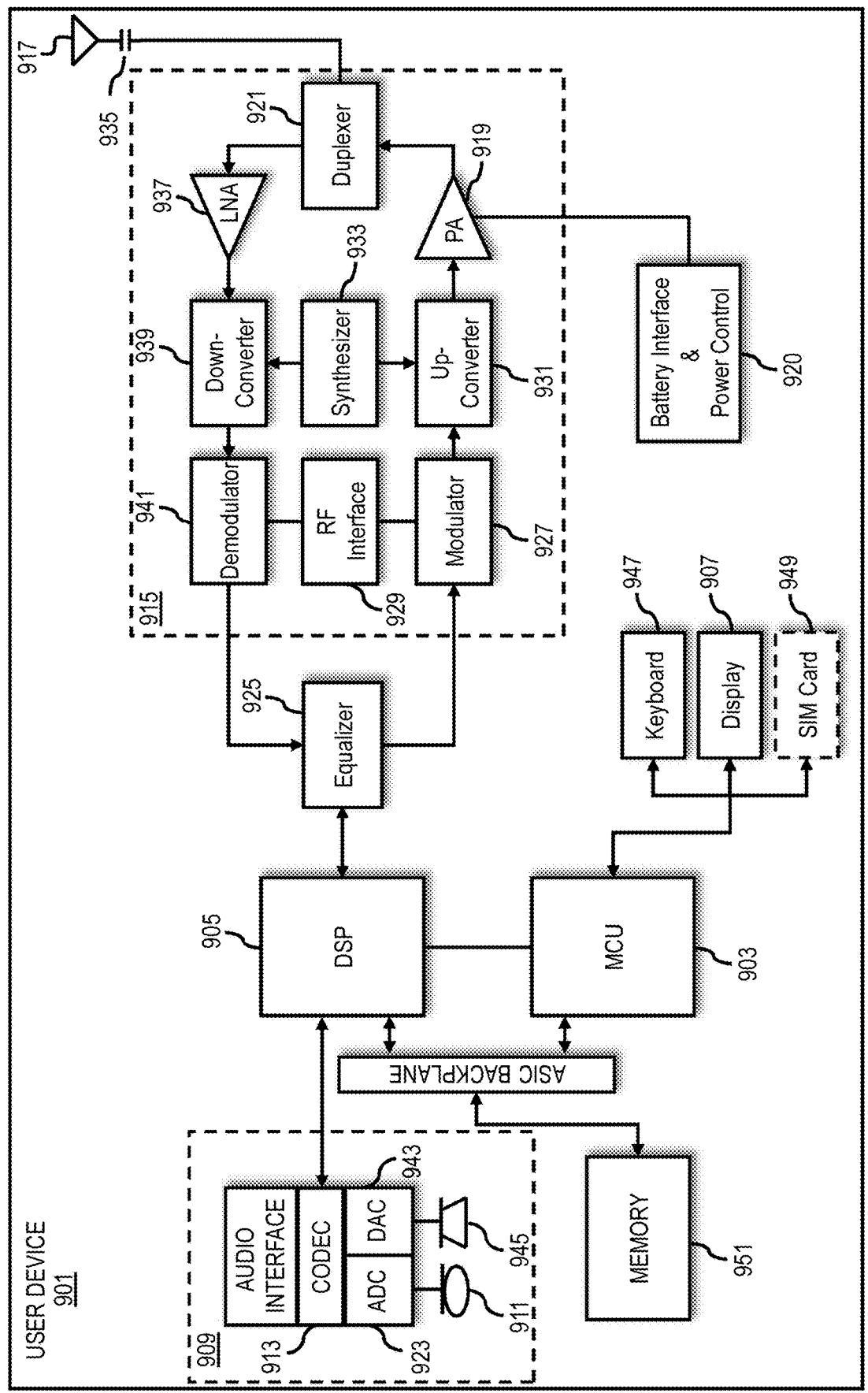

METHOD AND APPARATUS FOR PROVIDING ARGUMENTATIVE NAVIGATION ROUTING

BACKGROUND

Navigation systems and services have enjoyed widespread acceptance and use by consumers, but service providers and developers of such systems continue to face significant technical challenges to providing improved human-computer interaction. For example, traditional navigation systems often present recommended navigation routing information based on algorithms or parameters that may not be apparent to a user. This can leave the user with questions regarding the system's recommendations, thereby potentially making the user more likely to ignore and ultimately avoid using the navigation system.

SOME EXAMPLE EMBODIMENTS

Therefore, there is a need for an approach for providing argumentative navigation routing, for instance, to enable a user to interact with the navigation system to request justification arguments for the recommendations that the navigation system is presenting.

According to one embodiment, a computer-implemented method comprises determining a recommended route and an alternative route. The method also comprises iteratively presenting one or more justification messages in support of the recommended route until a response is detected from a user that either rejects or accepts the one or more justification messages. The one or more justification messages, for instance, are selected from among a plurality of argumentative reason classes. The method further comprises determining an accepted argumentative reason class from among the plurality of argumentative reason classes that corresponds to an accepted justification message of the one or more justification messages. The method further comprises prioritizing the accepted argumentative reason class to generate one or more subsequent justification messages in a subsequent argumentative routing interaction.

According to another embodiment, an apparatus comprises a processor, and a memory including computer program code, the memory and the computer program code configured to, with the processor, cause, at least in part, the apparatus to determine a recommended route and an alternative route. The apparatus is also caused to iteratively present one or more justification messages in support of the recommended route until a response is detected from a user that either rejects or accepts the one or more justification messages. The one or more justification messages, for instance, are selected from among a plurality of argumentative reason classes. The apparatus is further caused to determine an accepted argumentative reason class from among the plurality of argumentative reason classes that corresponds to an accepted justification message of the one or more justification messages. The apparatus is further caused to prioritize the accepted argumentative reason class to generate one or more subsequent justification messages in a subsequent argumentative routing interaction.

According to another embodiment, a computer-readable storage medium carries one or more sequences of one or more instructions which, when executed by one or more processors, cause, at least in part, an apparatus to determine a recommended route and an alternative route. The apparatus is also caused to iteratively present one or more justification messages in support of the recommended route until a response is detected from a user that either rejects or accepts the one or more justification messages. The one or more justification messages, for instance, are selected from among a plurality of argumentative reason classes. The apparatus is further caused to determine an accepted argumentative reason class from among the plurality of argumentative reason classes that corresponds to an accepted justification message of the one or more justification messages. The apparatus is further caused to prioritize the accepted argumentative reason class to generate one or more subsequent justification messages in a subsequent argumentative routing interaction.

According to another embodiment, an apparatus comprises means determining a recommended route and an alternative route. The method also comprises iteratively presenting one or more justification messages in support of the recommended route until a response is detected from a user that either rejects or accepts the one or more justification messages. The one or more justification messages, for instance, are selected from among a plurality of argumentative reason classes. The method further comprises determining an accepted argumentative reason class from among the plurality of argumentative reason classes that corresponds to an accepted justification message of the one or more justification messages. The method further comprises prioritizing the accepted argumentative reason class to generate one or more subsequent justification messages in a subsequent argumentative routing interaction.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention. In one embodiment, the apparatus is further caused to present the justification message based on receiving user request following a presentation of the recommended route.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 4A-4C are flowcharts of processes for generating justification messages for providing argumentative justification messages, according to one embodiment;

FIG. 9 is a diagram of a user device that can be used to implement an embodiment.

DESCRIPTION OF SOME EMBODIMENTS

Examples of a method, apparatus, and computer program for providing argumentative navigation routing are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
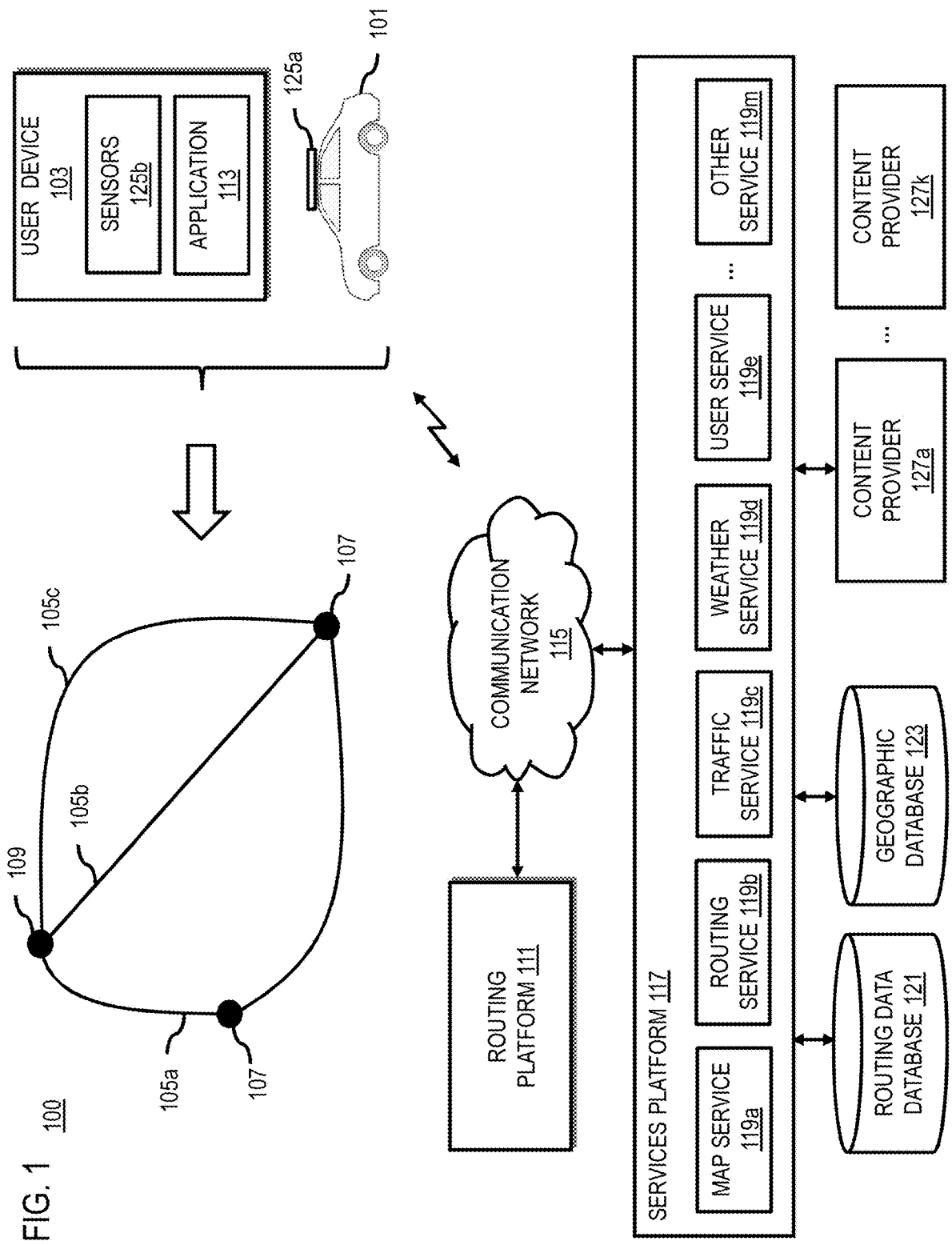
FIG. 1 is a diagram of a system capable of providing argumentative navigation routing, according to one embodiment.

FIG. 1 is a diagram of a system capable of providing argumentative navigation routing, according to one embodiment. Typically, drivers (e.g., a driver of a vehicle 101) and/or other users of navigation services (e.g., a user of a user device 103 such as a smartphone, personal navigation device, etc.) often have strong intuitions about preferable routes among possible routes 105a-105d between an origin 107 and a destination 109. If a router (e.g., a routing platform 111, navigation application 113 executing on the user device 103 or vehicle 101, or any other navigation routing engine) proposes a recommended route (e.g., a route 105d) that deviates from this intuition (e.g., a route 105c that the driver or user normally takes), the driver or user may choose to ignore the recommended route. For example, the intuitive route 105c may be route that the driver normally takes, but the router has recommended and presented the recommended route 105d. Traditionally, the recommended route 105d may be presented based on routing algorithms and criteria that may not be readily apparent to the driver. As a result, the driver may take the usual route 105c instead without understanding why the recommended route 105d was presented in the first place. This can create a poor user experience and lead to the driver to have less confidence in the routing guidance provided by the router. Accordingly, navigation routing and mapping service providers face significant technical challenges to presenting information to a driver to enable drivers to understand why routing recommendations differ from a user's experience or intuition about routes.

To address these technical challenges, the system 100 of FIG. 1 introduces the capability for a user to "argue" with the navigation system (e.g., the routing platform 111, navigation application. For example, in one embodiment of this argumentative routing approach, the system 100 enables a user to interact with the routing platform 111 to ask: "Why this route?" (e.g., assuming the navigation system or routing platform 111 can identify possible alternatives to compare to) or "Why not a route via city X?" (e.g., directly providing the alternative to compare to). The system 100 for instance can construct arguments or justification messages in support of the recommended route by selecting messages that represent a set of possible argumentative reason classes (e.g., shortest travel time, presence of traffic incidents, weather conditions, etc.) stored by the system 100. The different reason classes sequentially or iteratively presented to a user to determine whether user accepts or rejects the reasons or arguments (e.g., indicated by the user accepting the recommended route, selecting an alternative route, asking for additional reasons, etc.). The system 100 can then "learn" the reasons that are most effective on the user based on the accepted to rejected responses from the user. In this way, the system 100 can adapt future or subsequent argumentative routing interactions for the user or other similar users based on the argumentative reason classes that were either accepted or rejected.

In another embodiment, the system 100 can detect a deviation of the recommended route from the traditional or usual route taken by a user (e.g., in case of recurring routing) and pre-emptively present an justification or argument messages in support of the recommended route. As described above, the justification message can be generated based on argumentative reason classes that were previously accepted by the user to provide a potentially more effective argument. In other words, if the system 100 can identify alternative routes to a currently recommended route, the reason (e.g., the learned reason that is most effective on a user or group of users) about why the recommended route is preferable to the alternative routes (e.g., a deviation from historical travel patterns), and communicate this to users, it may advantageously improve the users' readiness to accept the proposed or recommended route. In presenting the information or data indicating the reason (e.g., the deviation from historical travel patterns), the system 100 is essentially "arguing" to convince the user or driver that the recommended route is the optimal route because current conditions (e.g., traffic, weather, other incidents along the route, etc.) cause a deviation of the recommended route from traditional or usual routes taken or that would otherwise be recommended under "normal" or historical conditions.

In one embodiment, the system 100 integrates the routing platform 111 over a communication network 115 with a services platform 117 to provide argumentative routing. The services platform 117 can include one or more services 119a-119m (also collectively referred as services 119) that can provide real-time and/or historical data for calculating a recommended route for a current context and then comparing the recommended route against the historical routing data of alternative routes and/or alternative routing contexts (e.g., as stored in a routing data database 121) to determine deviations from historical travel patterns and present arguments or reasons in favor of selecting the recommended route based on the deviations. By way of example, the services 119 can include but are not limited to a map service 119a that provides a geographic database 123 for routing, a routing service 119b for generating navigation routes using any routing engine known in the art, a traffic service 119c for providing real-time and/or historic travel data along potential routes, a weather service 119d for providing real-time and/or historic weather data along potential routes, a user service 119e for providing personalized user data and/or preferences for routing, and/or other related or available service 119m than can interface with the routing platform 111 to provide argumentative routing according to the embodiments described herein.

While traditional approaches may say that the recommended route is shorter by 10 minutes than another route, the various embodiments described herein can provide a reasoned argument for selecting the route, e.g., based on previous user argumentative routing interactions with the system 100. For example, using embodiments of argumentative routing, the system 100 may present a recommended navigation route to a driver. The driver then responds (e.g., via a voice-based or other user interface) asking why the system 100 has not recommended a proposed alternative route (e.g., because the user usually travels that alternative route and believes that it is shorter). The routing platform 111 can generate justification messages or reasons in support of the recommended based on the argumentative reason classes previously accepted by the user or similar users. For example, if the user has previously accepted reasons based on shorter travel times, distances, estimated times of arrivals (ETAs), the system 100 can retrieve and compare current (e.g., real-time) and historical routing data to determine that the recommended route is usually not shorter than the user's proposed alternative route, but under the current context and/or current routing data, the recommended route is shorter than the alternative route. In addition or alternatively, the system 100 can identify other secondary reasons as additional or secondary arguments. For example, the system 100 can determine or pinpoint a traffic issue or other issue (e.g., weather, special event, etc.) along the alternative route that caused system 100 recommend another route. The system 100 can then provide these determined reasons to the user as arguments in favor of the recommended route. In one embodiment, the order or sequence of the different types of reason classes (e.g., shorter travel time, traffic incident, weather, special event, etc.) for the justification or argument messages can be based on a ranking of the reasons based on what reasons were previously accepted or rejected. In yet another embodiment, the rankings and/or the determined user acceptance/rejection of the reasons can be context dependent (e.g., length of trip, time of day, day of week, purpose of trip, etc.).

As discussed above, the advantage of the various embodiments for argumentative routing is that users might be more inclined to follow routes proposed by their navigation system or device. In turn, having more users' complying with recommended routes is beneficial for:

The users—because users will be benefit from shorter travel times and/or distances to arrive at their destinations more quickly (e.g., assuming the recommended route really is the best or optimal route according to the provided criteria);

The perception of the router product (e.g., routing platform 111)—because users will have the perception that the router creates useful suggestions by taking the recommended routes more often; and The environment—because users would waste less energy by traveling shorter and/or less congested routes (e.g., assuming better routes mean less energy wasted by the vehicles 101 being stuck in congestion).

Figure 2:
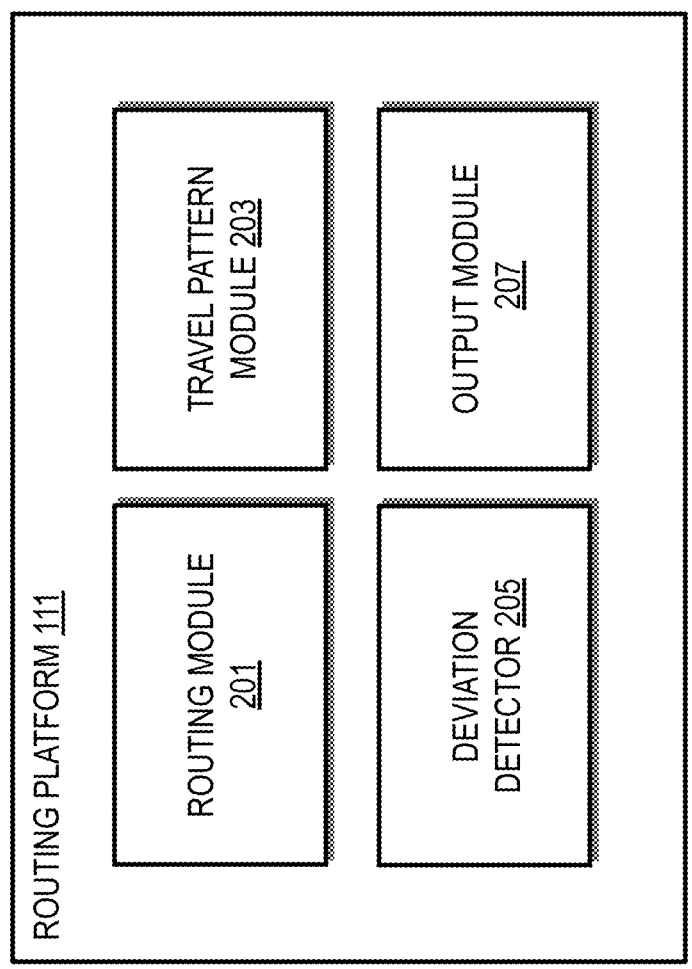
FIG. 2 is a diagram of the components of a routing platform, according to one embodiment.

FIG. 2 is a diagram of the components of a routing platform, according to one embodiment. As shown in FIG. 2, the routing platform 111 includes one or more components for providing argumentative routing according to the various embodiments described herein. It is contemplated that the functions of these components may be combined or performed by other components of equivalent functionality. In this embodiment, the routing platform 111 includes a routing module 201, travel pattern module 203, deviation detector 205, and output module 207. The above presented modules and components of the routing platform 111 can be implemented in hardware, firmware, software, or a combination thereof. Though depicted as a separate entity in FIG. 1, it is contemplated that the routing platform 111 may be implemented as a module of any other component of the system 100 (e.g., a component of the services platform 117, any of the services 119, vehicle 101, user device 103, application 113 executing on the user device 103, etc.). In another embodiment, one or more of the modules 201-207 may be implemented as a cloud-based service, local service, native application, or combination thereof. The functions of the routing platform 111 and the modules 201-207 are discussed with respect to FIGS. 3-5 below.

Figure 3:
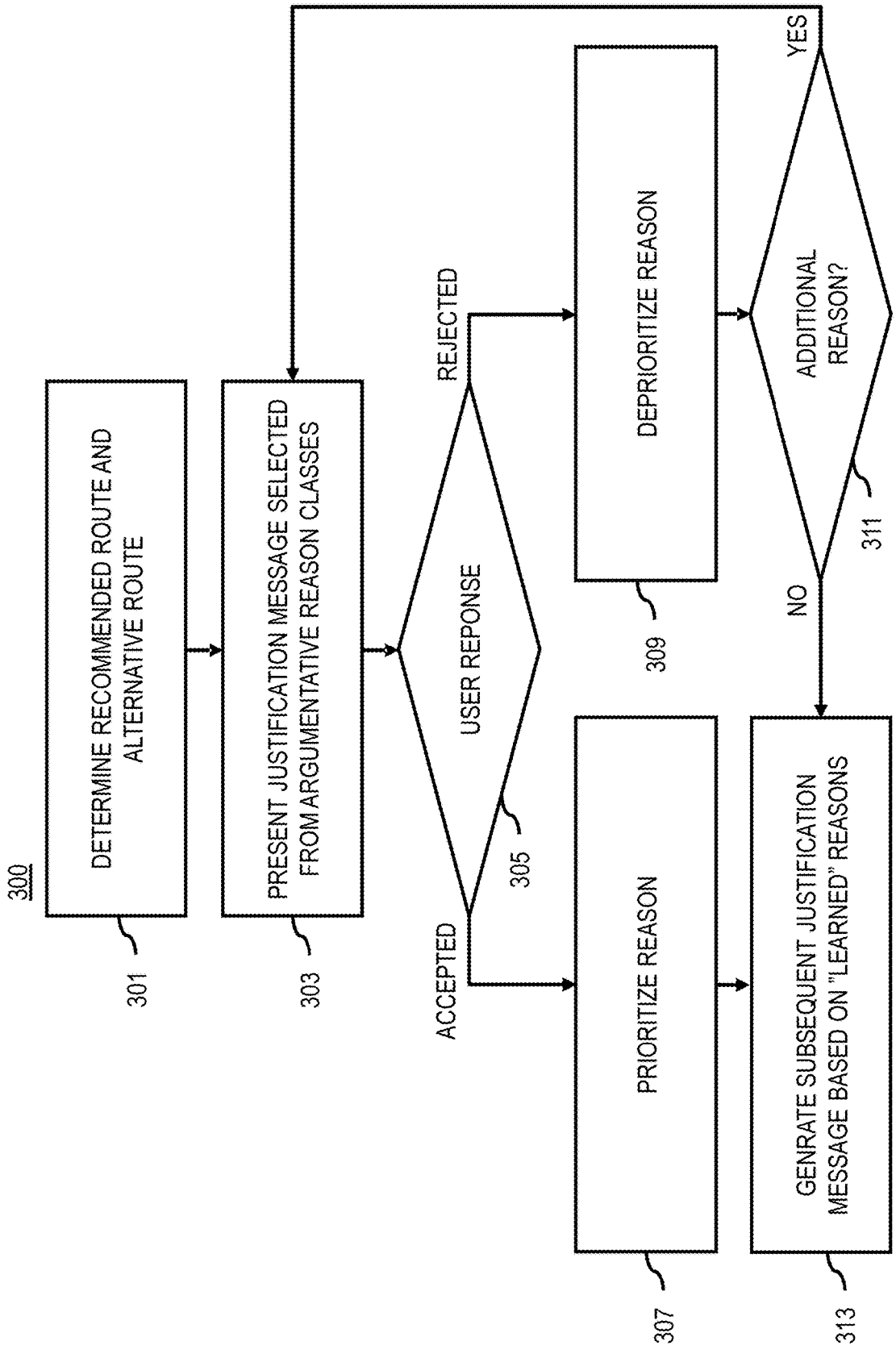
FIG. 3 is a flowchart of a process for providing argumentative navigation routing, according to one embodiment.
Figure 8:
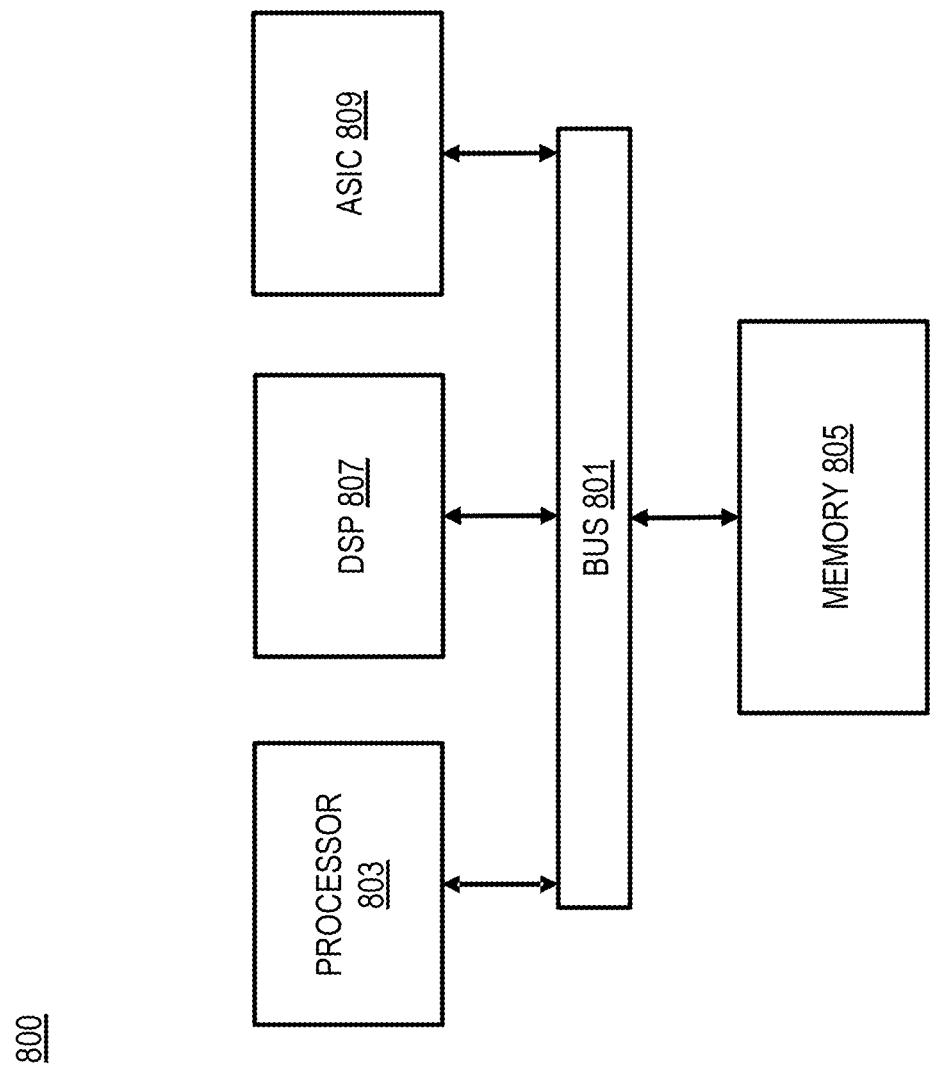
FIG. 8 is a diagram of a chip set that can be used to implement an embodiment.

FIG. 3 is a flowchart of a process for providing argumentative navigation routing, according to one embodiment. In various embodiments, the routing platform 111 and/or any of the modules 201-207 of the routing platform 111 may perform one or more portions of the process 300 and may be implemented in, for instance, a chip set including a processor and a memory as shown in FIG. 8. As such, the routing platform 111 and/or the modules 201-207 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps.

In one embodiment, the process 300 enables the routing platform 111 to interpret the routing results (e.g., recommended and alternative routes to a destination) to enable communicating about them. The process 300 further enables the routing platform 111 to keep track of the history of user acceptances or rejections of different argumentative reason classes in support of a recommended route. In some embodiments, the routing platform 111 can also keep track of the history of both the routes driven by the driver and by all drivers, and then deviations from standard patterns could be derived to provide data for identifying applicable argumentative reason classes. In addition, temporal anomalies like traffic jams or other real-time events can be presented as additional justifications or reasons for a recommended route in, for instance, a conversational or equivalent navigation routing user interface.

In step 301, the routing platform 101 determines a recommended route and at least one alternative route to the recommended route. For example, step 301 can be initiated when a user interacts with the routing platform 111 to specify a destination (e.g., via an in-vehicle navigation system, application 113 on a user device 103, or equivalent) or otherwise request that the routing platform 111 to recommend or compute a navigation route. In some embodiments, the routing platform 111 an infer a destination and a request for a navigation route to the inferred destination based on historical mobility data (e.g., data on previously traveled routes, when those routes were traveled, under what conditions those routes were traveled, etc.) and/or other contextual data (e.g., calendar information, engaged activity, purpose of the trip, etc.). The routing module 201 can then use any routing engine known in the art to generate a recommended route based on current routing data. Current routing data refers to real-time data that is used to recommend a route based on the cost function (e.g., function based on minimizing travel distance, travel time, use of certain road types, etc.) used by the applied routing engine and/or selected by the user.

In one embodiment, the recommended route can then be presented to the user via a navigation system or application user interface (e.g., a voice-based, visual, audio, etc. user interface) to begin providing argumentative routing (e.g., providing reasons or justifications in favor of the recommended route to the user according to the embodiments described herein).

In addition, the routing module 201 determines or identifies alternatives to the recommended route by generating an alternative route using a routing engine, retrieving previously driven routes, etc. In one embodiment, the alternative route can be any other route or routes to the user's destination that can be compared with the recommended route regardless of how the routes are generated or acquired by the routing module 201. In one embodiment, the user can specify the alternative route in response to being presented with the recommended route. An example interaction to specify the alternative route for argumentative routing can be as follows:

(1) User: Enters Destination A
(2) Routing platform 111: Recommends Route 1 to Destination A
(3) User: Replies "Why is Route 1 recommended and not Route 2?" (e.g., via a voice-based conversational interface)

In the example above, the routing module 201 can parse the user input to determine that the alternative route to compare to is "Route 2". In another embodiment, if the user just replies "Why is Route 1 recommended" without specifying an alternative route, the routing module 201 can determine or otherwise infer the alternative route based on historical data indicating what route the user or other users usually take to the destination from the current starting location (e.g., the alternative route can be the most common route between the starting location and the destination as indicated in previously recorded routing data). It is noted that the process described above for determining alternative routes for comparison is provided by way of illustration and not as a limitation. It is contemplated that the alternative route can be determined using any process such as the next best or optimal route resulting from the routing engine, or according to the other examples and embodiments described further below.

In other words, the routing module 201 can identify the main route alternatives to a recommended route. In one embodiment, to facilitate a more conversational interaction between the user and the routing platform 111, the routing module 201 can also map names to the recommended and/or the alternative routes. For example, the names of the routes can be based on the most prominent waypoint, landmark, map feature, etc. along the route that distinguishes the route from among many routes. For example, if different routes to a destination passes respectively through different Cities A, B, and C. The route through City A can be referred to as "City A Route". Similarly, the route through City B can be referred to as "City B Route", and through City C as "City C Route". It is noted that naming by waypoint name is provided by way of illustration and it is contemplated that the routing module 201 can use any name, label, symbol, icon, representation, etc. to identify the recommended and alternative routes.

In step 303, after identifying one or more alternative routes to the recommended route, the routing platform 111 can generate and present one or more justification messages in support or in favor of the recommended route. The routing platform 111 can create the justification messages according to any of a set of argumentative reason classes maintained by routing platform 111. The argumentative reason classes provide argumentative categories based on various routing issues, parameters, criteria, conditions, etc. that can be used as the basis for comparing one navigation route to another. By way of example, the argumentative reason classes can include but is not limited to an estimated time of arrival (ETA), accidents, road hazards, road closures, construction events, weather conditions, special or public events, and/or the like associated with the recommended or alternative routes. In one embodiment, the output module 207 can present the different justification messages with their associated argumentative classes in a series of messages, wherein the reasons or messages are presented separately (e.g., in a conversational user interface or equivalent).

In one embodiment, the routing platform 111 can gather data for generating a justification message to indicate to the user why the routing module 201 has selected the recommended route over the alternative route using any real-time or historical data source from which the argumentative reasons in favor of the recommended route can be extracted. For example, the data from the services platform 117 (e.g., including a map service 119a, routing service 119b, traffic service 119c, weather service 119d, user service 119e, and other services 119m), routing data database 121, geographic database 123, etc. can be queried to evaluate the or determine the comparison parameters, criteria, issues, etc. associated with each argumentative reason classes.

Figure 4A:
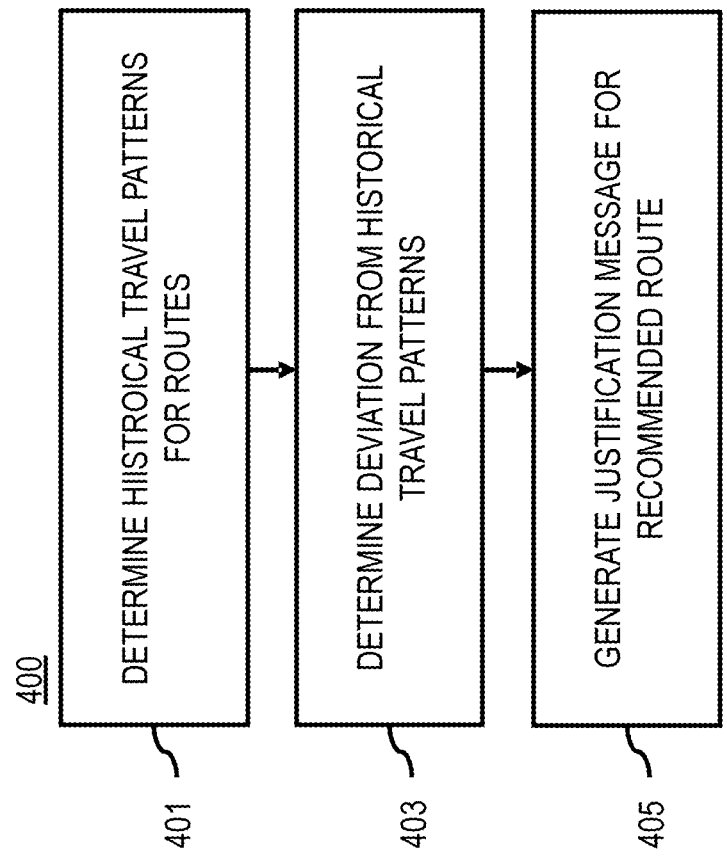

In one embodiment, the data can include historical routing data comprising previously recommended routes, previously traveled routes (e.g., mobility graphs by the user specifically for personalized routing or an aggregate or users for more general routing), previous contexts for the routes (e.g., traffic, weather, time of day, vehicle type, activity, etc.). FIG. 4A illustrates an example process 400 for generating justification messages based on historical data, according to one embodiment. In other words, as shown in FIG. 4A, the travel pattern module 203 can create "justifications" or "reasons" in favor of a route under any of the argumentative reason classes by using historic traffic information or routing data to compare if there is a deviation from previous route performances (e.g., routes that were previously traveled or recommended). For example, in step 401 of the process 400, the travel pattern module 203 determines a first historical travel pattern for the recommended route and a second historical travel pattern for the alternative route based on historical routing data (e.g., as stored in the routing data database 121). For example, the historical routing data can be used to determine the average historical estimated time of arrival (ETA), average historical travel distance, historical contexts (e.g., traffic, incidents, weather, etc.), and/or any other related historical routing parameter to indicate or represent the historical travel patterns for the recommended and alternative routes. In one embodiment, the historical contextual data can also or instead be provided by the services platform 117 and/or any services 119 of the services platform 117. The historical travel pattern can then indicate or otherwise be based on the historical ETA, travel distance, etc. and/or the historical contextual conditions (e.g., time, weather, traffic, etc.) under which the corresponding ETA, travel distance, etc. occurred.

In step 403, the deviation detector 205 determines a deviation from the historical travel pattern (e.g., historical ETA, travel distance, etc.) of the recommended route, the historical travel pattern (e.g., historical ETA, travel distance, etc.) of the alternative route, or a combination thereof based on current routing data. For example, the current routing data can be generated by the routing engine based on real-time contextual data (e.g., real-time traffic, traffic incidents, weather, etc.) to compute the current ETA, travel distance, etc. expected to occur when the travels to the destination. The current ETA, travel distance, etc. can then be compared to the historical travel patterns to determine whether there are any deviations or differences (e.g., beyond a threshold difference). The comparison can be performed using combinations of the recommended and alternative routes such as but not limited to:
  Current routing data of recommended route vs. historical routing data of recommended route;
  Current routing data of alternative route vs. historical routing data of alternative route;
  Current routing data of recommended route vs. historical routing data of alternative route; and
  Current routing data of alternative route vs. historical routing data of recommended route.

In one embodiment, the deviation detector 205 can also quantify the deviation, e.g., by taking a difference between the historical ETA/travel distance/etc. and current ETA/travel distance/etc. In yet another embodiment, the deviation detector 205 can also process real-time contextual data (e.g., probe trajectory data, incident reports, weather reports, etc.) from road links comprising the recommended routes and/or alternative routes to identify any potential incidents (e.g., traffic congestion, traffic incidents, etc.) that may be associated with the determined deviation from historical travel patterns or historical routing data and that may be indicative of one or more of the argumentative reason classes.

In step 405, the output module 207 generates a justification message for recommending the recommended route based on the deviation. The justification message, for instance, can be generated based on whether the historical routing data includes data on trips to the same destination under (1) the same context (e.g., different time, different weather, different traffic conditions, etc.) and/or (2) a different context. Examples of the two approaches are discussed with respect to FIGS. 4B and 4C.

FIG. 4B is a flowchart of a process 420 for generating a justification message based on historical data being available for the same trip under the same context (e.g., a temporal context such as the same time of day, same day of the week, etc.), according to one embodiment. In step 421, the travel pattern module 203 processes the historical routing data to obtain a route for the same origin/destination under the same context (e.g., for the same weekday, same time of day, for the last x weeks, etc.) as used for generating the recommended and/or alternative routes. If the same route is suggested most of the time (e.g., suggested for more than a threshold number of historical routing recommendations as determined by the deviation detector 205) under the same context, the output module 207 can generate a justification message that summarizes the detected deviation (step 423). In other words, the travel pattern module 203 can determine that the alternative route is a same route that a user has taken at a same time for a previous designated period of time based on the historical routing data. The deviation detector 205 can then determine that the deviation indicates, for instance, that the recommended route is shorter in distance, in time, or a combination thereof than the alternative route based on the current routing data (e.g., the routing data used to compute the recommended and/or alternative routes). For example, the justification message can be generated to state "the suggested route is on average x minutes shorter than the alternative route" (e.g., the alternative route can be whatever the user asked for, or the next best route one as determined by the routing module 201 if there was not a suggestion of an alternative route by the user) or equivalent.

In one embodiment, if the deviation detector 205 determines that historical routing data indicates that the alternative route was recommended under different contexts from the recommended route (e.g., for other timeslots), the output module 207 can generate a justification message that states "the alternative route is sometimes faster than the recommended route, but today, the alternative route is X minutes slower" or equivalent. In other words, the travel pattern module 203 can determine that the alternative route was recommended under a different context (e.g., temporal context) based on the historical routing data. The output module 207 can then generate the justification message to indicate that the alternative route is recommended over the recommended route under a different context but is not recommended under the current context. In one embodiment, if the deviation detector 205 can identify a cause for the deviation occurring on the alternative route (e.g., traffic congestion, traffic incident, etc.), the output module 207 can optionally include the identified cause in the justification message.

FIG. 4C is a flowchart of a process 440 for generating a justification message based on historical data being available for the same trip under a different context, according to one embodiment. In contrast to the process 420 of FIG. 4B, the process 440 of FIG. 4C is an approach that uses historical routing data calculated under a different context that used for generating the recommended and/or alternative routes. Accordingly, in step 441, the travel pattern module 203 processes the historical routing data to obtain a historically recommended or used route for the same origin/destination as the recommended and/or alternative routes for a different context (e.g., a temporal context such as but not limited to different weekdays, different times of day, for the last x weeks, etc.). In step 443, if the obtained historically recommended or used route differs from the currently recommended route, the travel pattern module 203 can further compare the two routes to determine commonalities and/or differences between contextual attributes and/or other characteristic attributes of the routes. In one embodiment, the commonalities and/or differences can be related to when the routes were historically recommended or used. The output module 207 can then include the determined commonality or difference in the justification message. For example, if the commonalities and/or differences indicate that the alternative route is historically recommended only in the morning when the alternative route is faster than the recommended and the recommended route is historically faster at the current time (i.e., that is not in the morning), the output module 207 can generate a justification message that states "the alternative route is faster than the recommended route only in the morning" or equivalent.

In one embodiment, the historical routing data used in the processes 400-440 of FIGS. 4A-4C can include historical or real-time routing data specific to individual users (e.g., for personalized routing) or common to a group or aggregate of users (e.g., for more general routing). By using a specific user's own personal routing data, the routing platform 111 can also provide for more personalized argumentative routing. If the currently recommended route or trip is one for which the system has stored previous occurrences (e.g., this would imply previous storage of the user's trip history in the user's personal routing data), the routing platform 111 can use the personal history to create tailored justification messages. If the current trip is one for which the system has stored previous occurrences (this would imply storage of the user's trip history), it can use that to create a tailored response. For example, if the determined deviation and justification message is based on a finding that "the alternative route is faster than the recommended route only in the morning", it is because the travel pattern module 203 has determined from the personal routing data that the user has predominantly asked for a route to this destination in the morning, and the time at the moment of route query is not morning, but, e.g., evening. Then, a justification message would be "You normally take this trip in the morning, where the alternative route is faster, but in the evening, the recommended route is faster (by X minutes on average)".

Returning to the process 300 of FIG. 3, in step 303, the output module 207 presents the justification messages based on the argumentative reason classes described above in a user interface of device associated with the user (e.g., a driver who requested a route to a destination). In one embodiment, the presentation of the justification message to provide argumentative routing can be initiated by the user (e.g., when the user directly asks the routing platform 111 to explain why a particular route is recommended, proposes an alternative route, and/or the like). In another embodiment, the justification message or argument routing can also be generated automatically without user intervention based on pre-configured criteria or rules. For example, one rule can cause the routing platform 111 to automatically provide or trigger argumentative routing when the routing platform 111 determines that the recommended route is different from the default or historical route (i.e., the last n times a trip to the specified destination was requested the default route was recommended or taken, but under the current context, the routing platform 111 has recommended a different route).

In one embodiment, the output module 207 presents the justification or reasons in favor of the recommended route as a series, wherein each reason or justification message is presented separately for a user to respond to each reason or message. In other words, the output module 207 iteratively presents one or more justification messages in support of the recommended route until a response is detected from a user that either rejects or accepts the one or more justification messages, wherein the one or more justification messages are selected from among a plurality of argumentative reason classes.

Figure 5:
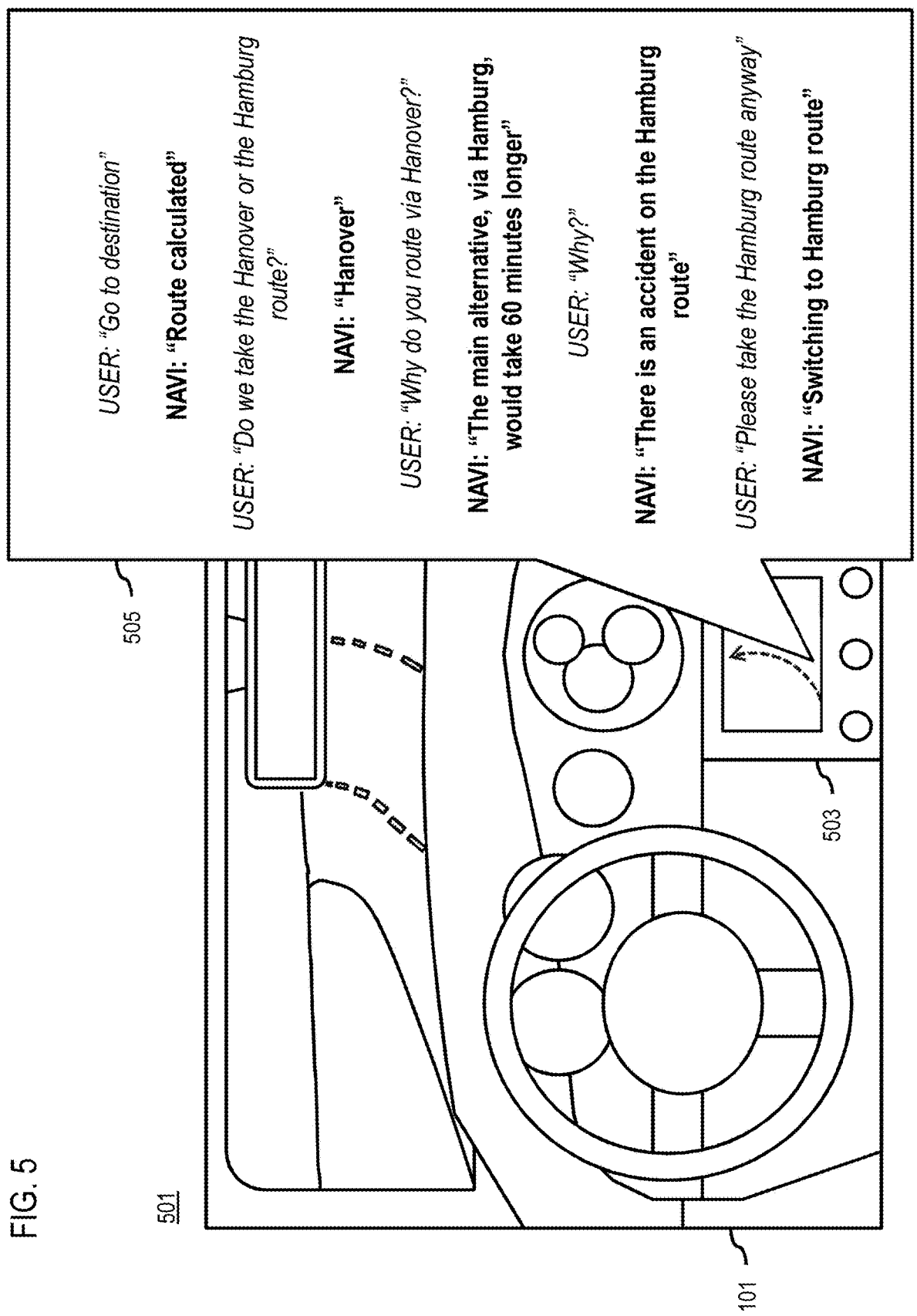
FIG. 5 is a diagram of a user interface for providing argumentative routing, according to one embodiment.

In one embodiment, the output module 207 can present the justification messages in a conversational user interface (or any other type user interface). FIG. 5 is a diagram of an example user interface 501 for providing argumentative routing, according to one embodiment. In the example of FIG. 5, a user (not shown) is a driving a vehicle 101 equipped with a navigation system 503 (e.g., in conjunction with the routing platform 111 or equivalent) capable of providing argumentative routing according to the embodiments described herein. The navigation system 503 provides a conversational voice-based user interface, and the dialog box 505 provides text to indicate exemplary interactions between the user (e.g., indicated in the dialog box 505 by the label "User" and italicized text) and the navigation system 503 (e.g., indicated in the dialog box 505 by the label "Navi" and bolded text).

The user begins by requesting that the navigation system 503 calculate a route to a specified destination (e.g., User issues a voice command: "Go to destination"). The navigation system 503 parses the destination from the user's speech input (e.g., using a voice recognition system), calculates a route from the current location of the vehicle 101 to the destination using a fastest route routing algorithm, and responds with a message indicating "Route calculated". The user has traveled to the destination in the past and knows that the two main routes to the destination include a route through Hanover and another route through Hamburg. In this example, the navigation system 503 has mapped the respective cities to respective routes to provide route names (e.g., Hanover route and Hamburg route). The user further asks the navigation system 503, "Do we take the Hanover or the Hamburg route?" The navigation system 503 has calculated that the Hanover route is the recommended or selected route and responds with "Hanover".

To initiate argumentative routing, the user asks the navigation system 503, "Why do you route via Hanover?" The navigation system 503 again parses the user's speech input and determines that the user is requesting argumentative routing and justification in favor of the recommended Hanover route. As a result, the navigation system 503 identifies the main alternative route to the destination (i.e., the Hamburg route) and generate justification messages in favor of the recommended Hanover route over the alternative Hamburg route according to the embodiments described herein. (e.g., each message belonging to a different argumentative reason class such as ETA or traffic incident). In this case, the navigation system 503 determines form the historical routing data that while the alternative Hamburg route may be historically faster than the recommended Hanover route, current traffic conditions (and/or other contextual conditions) along the alternative Hamburg route make it slower than the recommended Hanover route. The navigation system 503 generates a first justification messages based on the detected deviation using an ETA-based argumentative reason class stating to respond to the user, "The main alternative, via Hamburg, would take 60 minutes longer." In this example, the user remains unsatisfied with the reason of the first justification message and requests additional reasons by replying "Why?" In response, the navigation system 503 presents a second justification message using a detected accident on the alternative route and responds, "There is an accident on the Hamburg route."

In one embodiment, if the user is satisfied with the system responses, the user can accept the justifications and recommended route. Alternatively, the user can disregard the justification and override the recommended route by commanding the navigation system 503 to "Please take the Hamburg route anyway." The navigation system 503 can then switch to the alternative route and confirm the switch by replying, "Switching to Hamburg route." It is noted that the override command is provided by way of illustration and not as a limitation. It is contemplated that, in one embodiment, the navigation system 503 can support additional argumentative interaction including but not limited to: (1) asking for a justification with respect to another alternative route; (2) asking for another alternative route through a specified waypoint, (3) asking for an alternative route that provides a shorter delay than the main alternative route, (4) asking for an alternative route using different routing parameters or algorithms (e.g., distance vs time, fuel efficiency, road type, etc.).

The example of FIG. 5 illustrates the iterative presentation of justification messages of the process 300 of FIG. 3, according to one embodiment. For example, after a justification message based on a first argumentative reason class is presented in step 301, the routing platform 111 determines whether a user response to the justification indicates whether the user as accepted or not accepted the justification (step 305). The output module 207, for instance, can determine whether the response from the user either rejects or accepts the one or more justification messages based on determining that the user selects the recommended route, selects the alternative route, requests another justification message, or a combination thereof. This selection can be made by voice any other user interaction. Alternatively, the user selection or response can be based on detecting the actual route driven by the user (e.g., the user continues to travel using the recommended or changes direction to the alternative route).

In step 307, if the user accepts the justification message, the routing platform 111 can determine an accepted argumentative reason class from among the plurality of argumentative reason classes that corresponds to the accepted justification message of the one or more justification messages that are presented to the user. The routing platform 111 can then prioritize the accepted argumentative reason class to generate subsequent justification messages in subsequent argumentative routing interactions.

If the user rejects the justification message, the routing platform 111 can determine a rejected argumentative reason class from among the plurality of argumentative reason classes that corresponds to the rejected justification message (step 309). The routing platform 111 can then deprioritize the rejected argumentative reason class to generate subsequent justification messages in subsequent argumentative routing interactions. If there are additional justification messages based other argumentative reason classes to present and/or if the user requests additional reasons, the output module can return to step 303 to present the next justification message in the series and determine the user response to perform another iteration through the message/user response process cycle.

In summary, the routing platform 111 can generate a series of justification messages based on different argumentative reason classes to present to a user. In one embodiment, the reasons can be classed (e.g., ETA, accidents, road hazards, closures, construction, weather conditions, public events that affect traffic flow, etc.). The routing platform 111 can analyze which of these messages/reasons are accepted or rejected by the user. This allows for learning which type of reasons are more likely to persuade the user. The output module 207 can then generate justification messages with reasons that have been "learned" to be effective on the user (step 313). To determine which reasons are more likely to persuade the user or is more effective, the routing platform 111 can determine an acceptance or rejection rate (or equivalent metrics) for messages based on a given argumentative reason class. The reason classes with the higher acceptance rates or lower rejection rates can be designated as more likely to persuade or more effective.

In one embodiment, the routing platform 111 can rank the argumentative reason classes (along with ranges for non-binary issues like expected delays, amount of rain/snow, construction site lengths, etc.) and drive the argumentation interaction step by step, starting with reasons more likely to persuade the user. In other words, the routing platform 111 can generate a ranking of plurality of argumentative reason classes based on user responses that either accepts or rejects the one or more justification messages. The routing platform 11 can then determine a sequence of the plurality of argumentative reason classes to generate the one or more subsequent justification messages based on the ranking.

In yet another embodiment, the user may also accept different reasons on longer routes (e.g., between cities/towns) than shorter routes (e.g., routes within a city), or can be more likely to accept a set of reasons over another based on the time of day, month, year, season, etc. The routing platform 111 can learn these contextual idiosyncrasies as well. For example, the routing platform 111 can determine a context (e.g., route length, time of day, day of week, season, trip purpose, number of passengers, etc.) associated with the recommended route, the alternative route, the subsequent argumentative routing interaction, or a combination thereof. The routing platform 111 can then determine the rankings, prioritization, deprioritization, etc. of the argumentative reason classes separately for individual contexts.

Returning to FIG. 1, as described above, the system 100 includes a routing platform 111 to perform the functions associated with providing argumentative routing according to the embodiments described herein. The system 100 also includes one or more vehicles 101 and/or user devices 103 with connectivity to the routing platform 111 over a communication network 115. In one embodiment, the vehicles 101 and/or user devices 103 are or may include navigation systems or other devices (e.g., mobile devices) capable of executing applications 113 configured to perform route calculation and provide argumentative routing as described according to the various embodiments discussed herein. In one embodiment, the vehicles 101 and/or user devices 103 can act independently or as clients of the routing platform 111 to perform route calculation and provide argumentative routing. In addition, the vehicles 101, user devices 103, and/or applications 113 can perform all or a portion of the functions of the routing platform 111.

In one embodiment, a user can request, via the user device 103, a navigation route from a first location (e.g., location A) to a second location (e.g., location B). These two locations may be any two locations between an initial departure location and a final destination location with zero to many stopover locations, including the departure and destination locations. The routing platform 111 then uses at least one routing engine or algorithm to calculate an initial or baseline route from location A to location B with zero to many intermediate waypoints. By way of example, the routing engine or algorithm is any traditional routing engine or algorithm known in the art that is capable of generating a route according to at least one specific definition or cost function parameter of what is an optimal route such as a shortest or fastest route.

In one embodiment, the vehicles 101 and/or user devices 103 may include or have access to respective sensors 125a and 125b (also collectively referred to as sensors 125). By way of example, the sensors 125 may include various sensors for determining location and/or geospatial information to support the functions of the routing platform 111 and/or any other navigation system such as routing and mapping. The vehicles 101 and/or user devices 103 may utilize sensors 125 such as GPS or other satellite-based location receivers for determining geospatial or location information. The sensors 125 may also be used to perform cellular triangulation, assisted-GPS, or other location-based techniques for determining the geographic coordinates of a user device 103. In addition, the sensors 125 may be used to gather temporal, spatial or environmental information regarding the user devices 103 and/or the roadways/intersections on which the user devices 103 are traveling. By way of example, the sensors may detect speed and location data, tilt data (e.g., a degree of incline or decline of the vehicle along a path of travel), motion data, light data, sound data, image data, weather data and the like.

Still further, the sensors 125 may detect local or transient network and/or wireless signals, such as those transmitted by nearby devices during navigation of a vehicle associated with the user. This may include, for example, network routers as configured within a premise (e.g., home or business), vehicles 101, or other user devices 103 encountered during navigation. Other signals detected may include those transmitted by traffic related objects such as traffic lights, traffic cameras, signals, digital signage or the like. It is noted that, in certain implementations, the sensors 125 of a vehicle 101 in which a user device 103 is present may be configured to interact with the sensors 125 of the user device 103 for enabling data exchange (e.g., geospatial information exchange) and interaction. This exchange may be facilitated by way of any known or still developing range based or wireless communication protocols.

As noted above, in one embodiment, the routing platform 111 performs the functions associated with providing argumentative routing according to the embodiments described herein. In one embodiment, the system 100 includes an infrastructure for sharing geospatial information in real-time on multiple devices that includes a map-based service, application, and/or web interface that provides a typical map user interface. By way of example, a map-based service 119a, application, and/or interface can be provided over the communication network 115 by the services platform 117.

In one embodiment, the routing platform 111 may be configured to interface directly with the services platform 117 that provides various services. For example, in addition to the map service 119a (e.g., for providing mapping data and related information), the services platform 117 may include a routing service 119b (e.g., to provide a routing engine for calculating navigation routes), a traffic service 119c (e.g., to provide traffic updates and conditions along a route), a weather service 119d (e.g., to provide weather conditions along a route), a user service 119e (e.g., to enable a user to manage account information, configure personalized preferences, and engage in social interactions with other users), and/or other services 119m (also collectively referred to as services 119). In addition, the routing platform 111 and/or the services platform 117 may interface with one or more content providers 127a-127k (also collectively referred to as content providers 127) that provide/deliver content of various types and genres (e.g., geospatial information, mapping content, navigation content, travel content, locality content, marketing content) upon request. Requests may be initiated via the communication network 115 by way of one or more location-based applications 113 executing on the vehicles 101 and/or user devices 103 that are associated with respective users. By way of example, the applications 113 may access turn-by-turn navigation, routing information, maps, driving instructions, etc., for accessing, annotating, and/or sharing geospatial information. In one embodiment, the routing platform 111 can store and/or retrieve historical routing data and/or current or real-time routing data in the routing data database 121, and store geospatial information, annotations, and/or other related information in the geographic database 123 (further described below with respect to FIG. 6). In one embodiment, the services platform 117 and/or any of the services 119 may also have connectivity to the geographic database 123.

In one embodiment, the system 100 includes software to enhance the applications 113, the services 119, the services platform 117, the content providers 127, and/or any other component of the system 100 to enable a user to utilize navigational guidance information based on routes calculated to provide argumentative routing. In one embodiment, the system 100 can be used to augment (e.g., by automatically communicating to a user) navigational guidance with weather reports, traffic information, and other like information that may be of relevance to a user to providing argumentative routing. In one embodiment, the geospatial information and/or related route are saved on the participating users' user devices 103 or other equivalent data such as the routing data database 121.

By way of example, navigational information includes, but is not limited to, information related to routes, public spaces (parks, libraries, etc.), geographic areas (towns, boroughs, city blocks, etc.), points-of-interest (restaurants, shopping, etc.), and other like navigational information. Such information may be gathered as navigational information or to supplement preexisting information, and may further include crowd source data, network information, public databases, public information (public transport schedules, etc.), and other like information. In one embodiment, navigational information also may include a number of forms including annotations related to route information, location, logos, visual images, acronyms, and other like forms that may indicate navigational information.

By way of example, the user device 103 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, embedded navigation system, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the user device 103 can support any type of interface to the user (such as "wearable" circuitry, etc.). In one embodiment, the user device 103 can be a vehicle or a component part of a vehicle.

By way of example, the applications 113 may be any type of application that is executable at the user device 103, such as communication services (e.g., texting applications, calling applications, etc.), location-based service applications, navigation applications, camera/imaging application, media player applications, social networking applications, calendar applications, and the like. In one embodiment, one of the applications 113 at the user device 103 may act as a client for the routing platform 111 and perform one or more functions of the routing platform 111. In one scenario, users are able to select a destination via one or more map applications. In one embodiment, one or more receivers of the user device 103 may process and present routes and related justification messages to provide argumentative routing.

The communication network 115 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the components of the system 100 communicate with each other and other components using well known, new or still developing protocols. In this context, a protocol includes a set of rules defining how the network nodes within the communication network 115 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 6:
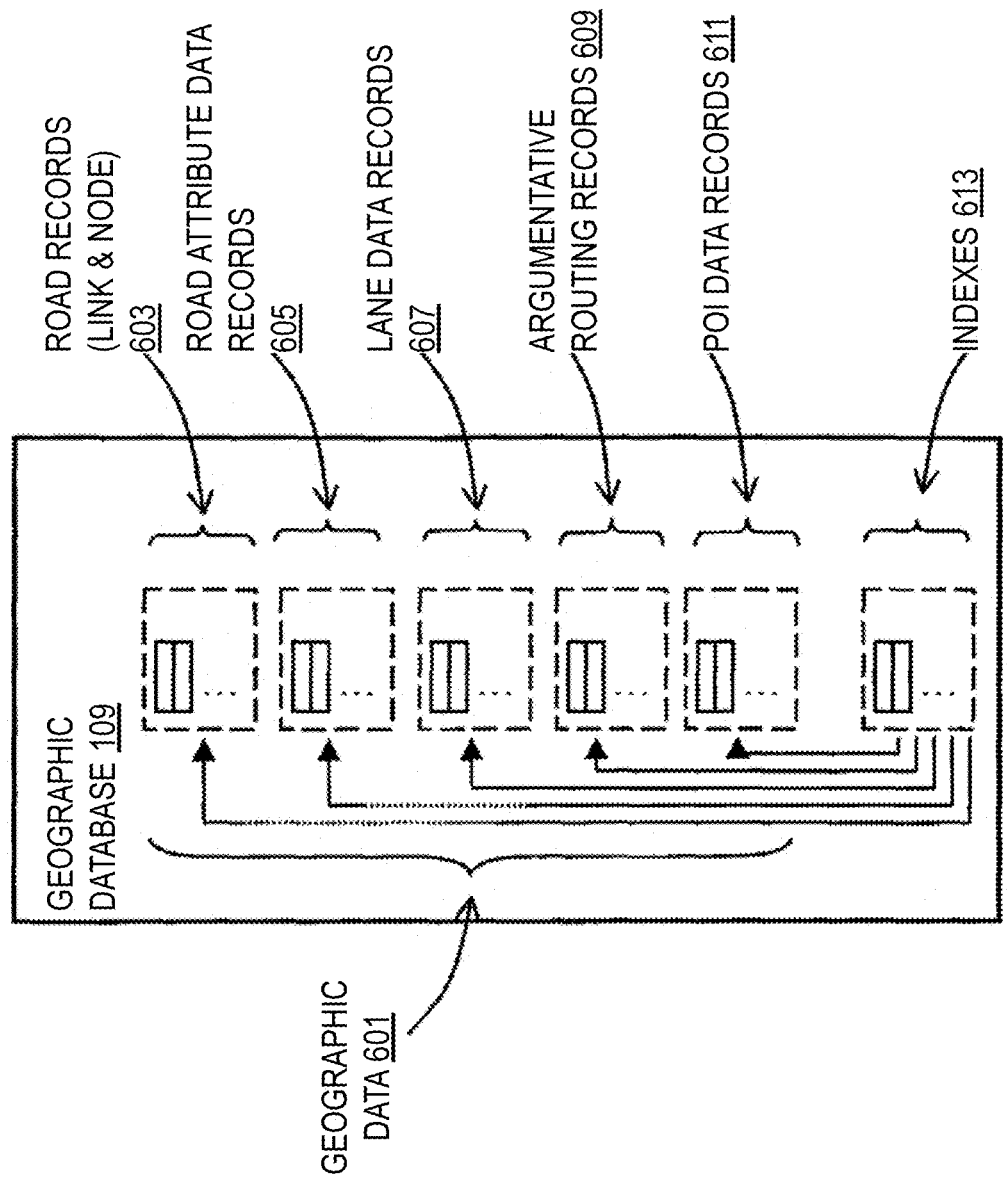
FIG. 6 is a diagram of the geographic database, according to one embodiment.

FIG. 6 is a diagram of the geographic database 123 (e.g., also referred to as a map database) of system 100, according to exemplary embodiments. In the exemplary embodiments, historical or current routing data (e.g., previously recommended or used navigation routes, corresponding contexts, and related data), justification messages, navigational guidance information, and/or any other date used or produced by the embodiments described herein can be stored, associated with, and/or linked to the geographic database 123 or data thereof. In one embodiment, the geographic or map database 123 includes geographic data 601 used for (or configured to be compiled to be used for) mapping and/or navigation-related services, such as for personalized route determination, personalized annotations, and/or geospatial information sharing, according to exemplary embodiments. For example, the geographic database 123 includes road (link and node) records 603, road attribute data records 605, argumentative routing records 607, argumentative routing records 609, POI data records 611, and indexes 613 for example. More, fewer or different data records can be provided. In one embodiment, other data records include cartographic ("carto") data records, routing data, and maneuver data. In one embodiment, the indexes 613 may improve the speed of data retrieval operations in the geographic database 123. The indexes 613 may be used to quickly locate data without having to search every row in the geographic database 123 every time it is accessed.

In one embodiment, information (e.g., components, areas, layers, features, text, and/or symbols) associated with personalized and/or generating routing data (e.g., navigation instructions), argumentative routing, usage data, personal driving history, travel profile information, user preferences, and/or the like can be stored in, linked to, and/or associated with one or more of these data records. For example, recorded route information can be matched with respective map or geographic records via position or GPS data associations (such as using known or future map matching or geo-coding techniques).

In exemplary embodiments, the road (link and node) records 603 are links or segments representing roads, streets, or paths, as can be used in the calculated route or recorded route information for determination of one or more personalized predictive models and navigational guidance information based on one or more previous behaviors, according to exemplary embodiments. In one embodiment, the road (link and node) records 603 also include end points corresponding to the respective road links or segments. The road (link and node) records 603 represent a road network, such as used by vehicles, cars, bicycles, and/or other entities. Alternatively, the geographic database 123 can contain path segment and node data records or other data that represent pedestrian paths or areas in addition to or instead of the vehicle road record data, for example.

In one embodiment, the road (link and node) records 603 can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. In one embodiment, these attributes are stored in the road attribute data records 605.

In one embodiment, the geographic database 123 also include information on other characteristics of the road network stored in the road records 603. For example, the geographic database 123 may include lane records 607 to provide lane information for road or travel segments. In one embodiment, the lane information can include a number of lanes, dimensions of the lanes, direction of travel of the lanes, and/or any other lane attributes or characteristics. As another example, the lane data records 607 may include information related to speed limits for road or travel segments. In one embodiment, speed limit information may include the actual speed limit as well as conditions or criteria for when the limits are applicable. For example, different speed limits can be specified based on time of day, type of vehicle, weather conditions, etc.

In one embodiment, the geographic database 123 can include argumentative routing records 609 for storing justification messages, deviation data, and/or any other related data associated with providing argumentative routing. In this way, generated justification messages, deviations, etc. can be retrieved and used for providing argumentative routing according to the embodiments described herein.

In one embodiment, the geographic database 123 can include data about POIs and their respective locations in the POI data records 611. The geographic database 123 can also include data about places, such as cities, towns, or other communities, and other geographic features, such as bodies of water, mountain ranges, etc. Such place or feature data can be part of the POI data 131 or can be associated with POIs or POI data records 611 (such as a data point used for displaying or representing a position of a city).

The geographic database 123 can be maintained by the content provider 127 (e.g., a map developer) in association with the services platform 117. The map developer can collect geographic data to generate and enhance the geographic database 123. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 123 can be a master geographic database stored in a format that facilitates updating, maintenance, and development. For example, the master geographic database 123 or data in the master geographic database 123 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data or geospatial information is compiled (such as into a platform specification format (PSF) format) to organize and/or configure the data for performing map or navigation-related functions and/or services, such as map annotation, route calculation, route guidance, map display, speed calculation, distance and travel time functions, and other functions, by a navigation device, such as by a user device 103, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 123 can be a master geographic database, but in alternate embodiments, the geographic database 123 can represent a compiled navigation database that can be used in or with end user devices (e.g., vehicles 101 and/or user devices 103) to provided navigation-related functions. For example, the geographic database 123 can be used with a vehicle 101 and/or user device 103 to provide an end user with navigation features. In such a case, the geographic database 123 can be downloaded or stored on the end user device, such as in applications 113, or the end user device can access the geographic database 123 through a wireless or wired connection (such as via a server and/or the communication network 115).

The processes described herein for providing argumentative routing may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
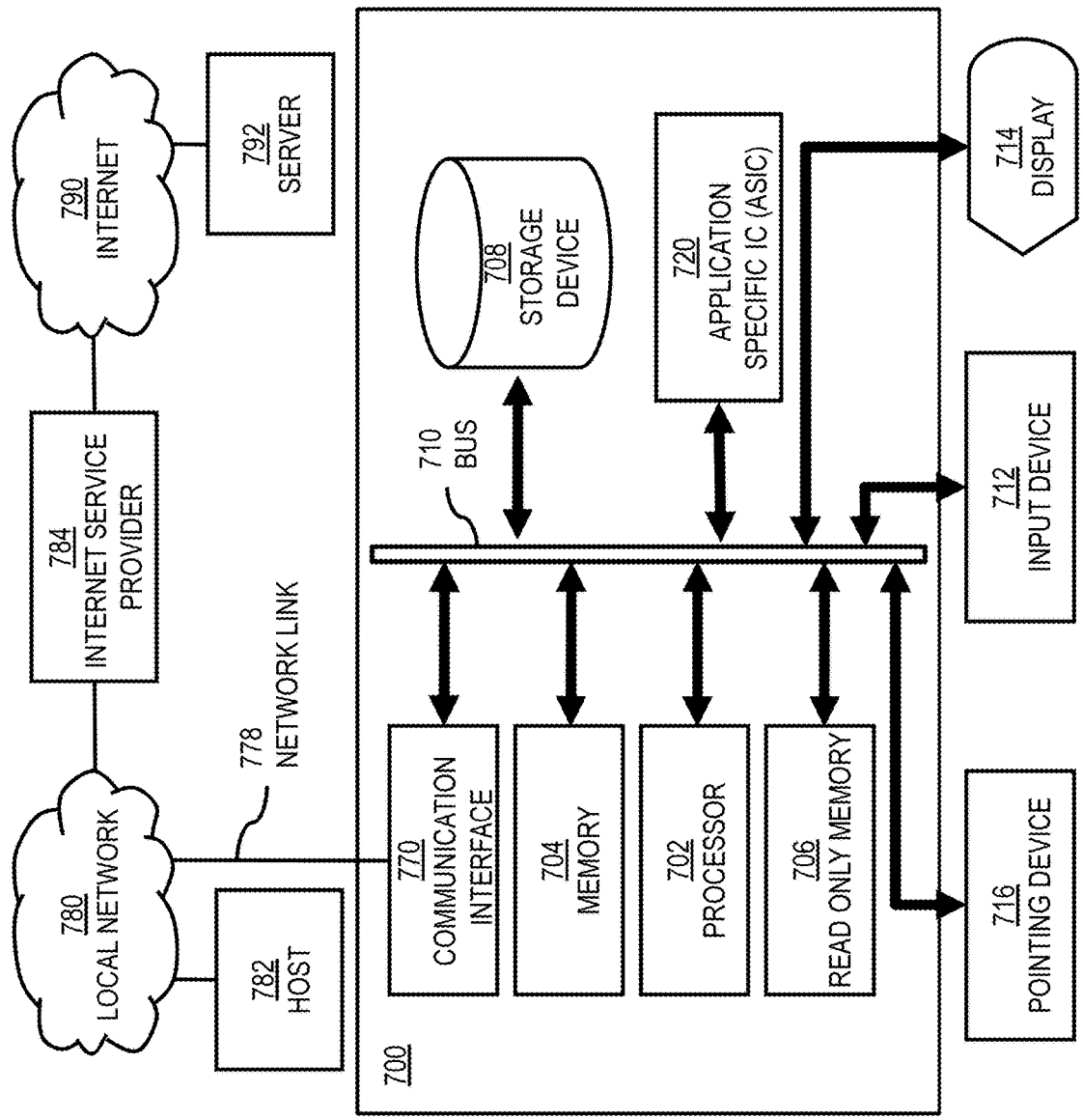
FIG. 7 is a diagram of hardware that can be used to implement an embodiment.

FIG. 7 illustrates a computer system 700 upon which an embodiment of the invention may be implemented. Computer system 700 is programmed (e.g., via computer program code or instructions) to provide argumentative routing as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to providing argumentative routing. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for providing argumentative routing. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing argumentative routing, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 115 for providing argumentative routing.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 8 illustrates a chip set 800 upon which an embodiment of the invention may be implemented. Chip set 800 is programmed to provide argumentative routing as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide argumentative routing. The memory 805 also stores the data associated with or generated by the execution of the inventive steps.

FIG. 9 is a diagram of exemplary components of a user device 103 or embedded device of a vehicle 101 capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and user device functions that offer automatic contact matching. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of user device 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the user device 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the user device 901 to provide argumentative routing. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the station. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the user device 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 951 may be, but not limited to, a single memory, CD, DVD, ROM, RAM, EEPROM, optical storage, or any other non-volatile or non-transitory storage medium capable of storing digital data.

An optionally incorporated SIM card 949 carries, for instance, important information, such as the cellular phone number, the carrier supplying service, subscription details, and security information. The SIM card 949 serves primarily to identify the user device 901 on a radio network. The card 949 also contains a memory for storing a personal telephone number registry, text messages, and user specific user device settings.

What is claimed is:

1. A method for providing argumentative navigation routing comprising:
   determining a recommended route and an alternative route;
   iteratively presenting one or more justification messages in support of the recommended route until a response is detected from a user, by way of a voice-based conversational interface, that either rejects or accepts the one or more justification messages, wherein the one or more justification messages are selected from among a plurality of argumentative reason classes;
   determining an accepted argumentative reason class from among the plurality of argumentative reason classes that corresponds to an accepted justification message of the one or more justification messages;
   prioritizing the accepted argumentative reason class to generate one or more subsequent justification messages in a subsequent argumentative routing interaction; and
   generating a ranking of the plurality of argumentative reason classes based on the response that either accepts or rejects the one or more justification messages.

2. The method of claim 1, further comprising:
   determining a rejected argumentative reason class from among the plurality of argumentative reason classes that corresponds to a rejected justification message of the one or more justification messages; and
   deprioritizing the rejected argumentative reason class to generate the one or more subsequent justification messages in the subsequent argumentative routing interaction.

3. The method of claim 1, further comprising:
   determining whether the response from the user either rejects or accepts the one or more justification messages based on determining that the user selects the recommended route, selects the alternative route, requests another justification message, or a combination thereof.

4. The method of claim 1, further comprising: determining a sequence of the plurality of argumentative reason classes to generate the one or more subsequent justification messages based on the ranking.

5. The method of claim 1, further comprising:
   determining a context associated with the recommended route, the alternative route, the subsequent argumentative routing interaction, or a combination thereof;
   wherein the prioritizing of the accepted argumentative reason class is further based on the context.

6. The method of claim 1, wherein the plurality of argumentative reason classes includes at least one of:
   an estimated time of arrival;
   an accident;
   a road hazard;
   a road closure;
   a construction event;
   a weather condition; and
   a public event.

7. The method of claim 1, further comprising:
   determining a first historical travel pattern for the recommended route and a second historical travel pattern for the alternative route based on historical routing data; and
   determining a deviation from the first historical travel pattern, the second historical travel pattern, or a combination thereof based on current routing data,
   wherein the one or more justification messages are further based on the deviation.

8. The method of claim 1, further comprising:
   determining that the alternative route is a same route that a user has taken at a same time for a previous designated period of time based on the historical routing data; and
   determining that the deviation indicates that the recommended route is shorter in distance, in time, or a combination thereof than the alternative route based on the current routing data,
   wherein at least one of the one or more justification messages is generated to indicate that the recommended route is shorter than alternative route.

9. The method of claim 1, further comprising:
   determining that the alternative route was recommended under a different context based on the historical routing data,
   wherein at least one of the one or more justification messages is generated to indicate that the alternative route is recommended over the recommended route under the different context but is not recommended under a current context.

10. An apparatus for providing argumentative navigation routing, comprising:
    a processor; and
    a memory including computer program code for a program,
    the memory and the computer program code configured to, with the processor, cause the apparatus to perform at least the following,
    determine a recommended route and an alternative route;

iteratively present one or more justification messages in support of the recommended route until a response is detected from a user, by way of a voice-based conversational interface, that either rejects or accepts the one or more justification messages, wherein the one or more justification messages are selected from among a plurality of argumentative reason classes;

determine an accepted argumentative reason class from among the plurality of argumentative reason classes that corresponds to an accepted justification message of the one or more justification messages;

prioritize the accepted argumentative reason class to generate one or more subsequent justification messages in a subsequent argumentative routing interaction; and generate a ranking of the plurality of argumentative reason classes based on the response that either accepts or rejects the one or more justification messages.

11. The apparatus of claim 10, wherein the apparatus is further caused to:

determine a rejected argumentative reason class from among the plurality of argumentative reason classes that corresponds to a rejected justification message of the one or more justification messages; and deprioritize the rejected argumentative reason class to generate the one or more subsequent justification messages in the subsequent argumentative routing interaction.

12. The apparatus of claim 10, wherein the apparatus is further caused to:

determine whether the response from the user either rejects or accepts the one or more justification messages based on determining that the user selects the recommended route, selects the alternative route, requests another justification message, or a combination thereof.

13. The apparatus of claim 10, wherein the apparatus is further caused to:

determine a sequence of the plurality of argumentative reason classes to generate the one or more subsequent justification messages based on the ranking.

14. A non-transitory computer-readable storage medium for providing argumentative navigation routing, carrying one or more sequences of one or more instructions which, when executed by one or more processors, cause an apparatus to at least perform the following steps:

determining a recommended route and an alternative route;

iteratively presenting one or more justification messages in support of the recommended route until a response is detected from a user, by way of a voice-based conversational interface, that either rejects or accepts the one or more justification messages, wherein the one or more justification messages are selected from among a plurality of argumentative reason classes;

determining an accepted argumentative reason class from among the plurality of argumentative reason classes that corresponds to an accepted justification message of the one or more justification messages;

prioritizing the accepted argumentative reason class to generate one or more subsequent justification messages in a subsequent argumentative routing interaction; and generating a ranking of the plurality of argumentative reason classes based on the response that either accepts or rejects the one or more justification messages.

15. The non-transitory computer-readable storage medium of claim 14, wherein the apparatus is caused to further perform:

determining a rejected argumentative reason class from among the plurality of argumentative reason classes that corresponds to a rejected justification message of the one or more justification messages; and deprioritizing the rejected argumentative reason class to generate the one or more subsequent justification messages in the subsequent argumentative routing interaction.

16. The non-transitory computer-readable storage medium of claim 14, wherein the apparatus is caused to further perform:

determining whether the response from the user either rejects or accepts the one or more justification messages based on determining that the user selects the recommended route, selects the alternative route, requests another justification message, or a combination thereof.

17. The non-transitory computer-readable storage medium of claim 14, wherein the apparatus is caused to further perform:

determining a sequence of the plurality of argumentative reason classes to generate the one or more subsequent justification messages based on the ranking.

* * * * *